US007624305B2

(12) United States Patent
De Araujo et al.

(10) Patent No.: US 7,624,305 B2
(45) Date of Patent: Nov. 24, 2009

(54) FAILURE ISOLATION IN A COMMUNICATION SYSTEM

(75) Inventors: Daniel F. De Araujo, Tucson, AZ (US); Paul M. Richards, Tucson, AZ (US); Brian A. Rinaldi, Tucson, AZ (US); Todd C. Sorenson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 650 days.

(21) Appl. No.: 10/991,780

(22) Filed: Nov. 18, 2004

(65) Prior Publication Data

US 2006/0104209 A1    May 18, 2006

(51) Int. Cl.
*G06F 11/00* (2006.01)
(52) U.S. Cl. .................................... 714/25
(58) Field of Classification Search ............. 714/25
See application file for complete search history.

(56) References Cited

U.S. PATENT DOCUMENTS

| 4,627,054 | A | * | 12/1986 | Cooper et al. ............ 714/11 |
| 4,999,838 | A | | 3/1991 | Horikawa |
| 5,099,485 | A | * | 3/1992 | Bruckert et al. .......... 714/11 |
| 5,157,667 | A | * | 10/1992 | Carusone et al. .......... 714/45 |
| 5,237,677 | A | | 8/1993 | Hirosawa et al. |
| 5,483,637 | A | * | 1/1996 | Winokur et al. .......... 714/26 |
| 5,815,647 | A | * | 9/1998 | Buckland et al. .......... 714/3 |
| 5,815,651 | A | | 9/1998 | Litt |
| 5,892,989 | A | * | 4/1999 | Kawasaki et al. ......... 396/87 |
| 6,182,248 | B1 | | 1/2001 | Armstrong et al. |
| 6,351,829 | B1 | * | 2/2002 | Dupont et al. ........... 714/48 |
| 6,442,708 | B1 | * | 8/2002 | Dierauer et al. .......... 714/25 |
| 6,678,840 | B1 | | 1/2004 | Kessler et al. |
| 6,732,300 | B1 | | 5/2004 | Freydel |
| 6,766,467 | B1 | * | 7/2004 | Neal et al. ............... 714/5 |
| 6,886,113 | B2 | * | 4/2005 | McKenzie et al. ........ 714/48 |
| 2004/0059966 | A1 | | 3/2004 | Chan et al. |

* cited by examiner

Primary Examiner—Robert W. Beausoliel, Jr.
Assistant Examiner—Amine Riad
(74) Attorney, Agent, or Firm—Quarles & Brady LLP

(57) ABSTRACT

A computer system including a communication fabric initiates a forced diagnostic to isolate and identify genuine error conditions which are discerned from sympathetic error conditions. Error counters are only incremented for each genuine error condition, precluding the need to set error counter threshold artificially high. Recovery events are logged in a recovery table and recovery actions are only initiated after the diagnoses processes is complete. This prevents duplication of recovery actions and the unnecessary implementation of low-level recovery actions when they will be followed by higher-level recovery actions.

5 Claims, 5 Drawing Sheets

FAILURE ISOLATION IN A COMMUNICATION SYSTEM

BACKGROUND OF THE INVENTION

1. Field of the Invention

This invention is related in general to the field of data storage systems. In particular, the invention consists of a system for isolating error conditions in a data communication fabric.

2. Description of the Prior Art

In FIG. 1, a computer storage system 10 includes host servers ("hosts") 12, data processing servers 14, data storage devices 16 such as redundant arrays of inexpensive/independent disks ("RAIDs"), and a data communication system 18. Requests for information traditionally originate with the hosts 12, are transmitted by the communication system 18, and are processed by the data processing servers 14. The data processing servers retrieve data from the data storage devices 16 and transmit the data back to the hosts 12 through the communication system. Similarly, the hosts 12 may write data the to the data storage devices 16.

The communication system 18 may be a communication bus, a point-to-point network, or other communication scheme. FIG. 2 illustrates a communication fabric 20 including a symmetrical multi-processor ("SMP complex") 22, a fabric controller 24, and a host adapter 26. The SMP complex 22 is a component of the data processing server 14 (FIG. 1) and the host adapter 26 is the interface for the host servers 12 (FIG. 1). Various error conditions may occur within any of these components. These error conditions may be critical, i.e., preventing the device from functioning, or may be transitory in nature. If a critical error occurs, the failed device must be re-initialized or replaced. However, transitory errors may be addressed according to the severity and frequency of the error.

Some errors result from faulty cables, power transients, or defective components. Some of these types of errors can be tolerated and accommodated by the communication fabric 20 as spurious events. However, a large number of non-critical errors may indicate impending component failure or that a component is in an unstable state requiring re-initialization. Counters may be used to track these non-critical errors. When a counter exceeds a pre-determined threshold, corrective action may be taken by resetting a device, quiescing a device so that it may be repaired, or fencing a device so to prevent further errors.

One problem is that a failure of any component of the communication fabric 20 may generate additional error conditions known as sympathy errors. These sympathy errors incorrectly increase the counts of the error counters. In order to accommodate this situation, the thresholds must be set higher than would otherwise be necessary in order to prevent premature resetting, quiescing, or fencing. This results in a system that is aware of an error condition and the most likely culpable component but has not experienced the error with enough frequency to overcome the artificially-high threshold. The problem is only compounded as the number of fabric components is increased. Accordingly, it is desirable to have a system for isolating and addressing error conditions. Additionally, it is desirable to resolve the error condition in the smallest possible amount of time.

In U.S. Pat. No. 4,627,054, Cooper et al. describe an interconnect and isolation mechanism for multiple computer processing units ("CPUs") joined on a processor bus. Cooper discloses isolating a failed CPU so that the rest of the system can continue operation. However, Cooper does not focus on detection of the failure or any failures that can be correlated back to the culpable component.

In U.S. Pat. No. 4,999,838, Horikawa discloses a system wherein a set of main processors has a peripheral processor and a means for returning the peripheral processor to an operational state after failure. However, Horikawa does not disclose a method of diagnosing error conditions to determine which peripheral processor is faulty and in need or service prior to complete failure.

In U.S. Pat. No. 5,237,677, Hirosawa et al. disclose using service processors to detect faults in remote processing units. Hirosawa describes storing the fault information and using that stored info to teach the system how to remedy the faults when later encountered. However, the system tries to generate standardized recovery processes based on current fault data, and stored fault data. This requires that the error condition continue until either the faulty device fails or an error threshold is exceeded. Accordingly, it is desirable to have a system that forces the error the manifest itself so that it may be isolated.

In U.S. Pat. No. 6,182,248, Armstrong et al. describe an error injection circuit and methodology that generates faults on a bus by driving the logic high or low, simulation normal noise and error conditions, and monitoring the bus traffic (clocks, data signals, error signals). However, the communication fabric 20 of a computer storage system 10 is an extremely complex system requiring a specific and complex diagnostic schema. Accordingly, it is desirable to have a system of isolating errors in a complex system.

SUMMARY OF THE INVENTION

The invention disclosed herein utilizes a forced diagnostic system to isolate faulty components of a communication fabric. This is accomplished by driving the communication fabric through a rigid sequence of bus stabilization, forced error detection, and a correlation of known resources states. This process discerns sympathy errors and indicates the true failing component. The forced diagnostic system allows the computer storage system to resume normal operation and address component error conditions by resetting the device, quiescing the device for repair, or fencing the device to prevent additional errors. Additionally, the diagnostic system eliminates the need for artificially-high error thresholds.

A SMP complex receives an initiating event, e.g. an interrupt sent from the host adapter, and begins an adapter warmstart process. During a warmstart, the system discards dynamic data structures and returns to the start of the microcode. This is similar to a coldstart without the reboot process. During this process, communication buses are quiesced and pending communication transactions are halted. The SMP complex then examines a fabric status register to see if a fabric protocol violation has occurred. Then, the SMP complex looks for evidence that a host adapter has failed. Subsequently, the SMP complex looks for an indication that the adapter warmstart process has timed out. This information is analyzed to determine one of several different fault scenarios to determine which error conditions are sympathetic and which ones are genuine.

Various other purposes and advantages of the invention will become clear from its description in the specification that follows and from the novel features particularly pointed out in the appended claims. Therefore, to the accomplishment of the objectives described above, this invention comprises the features hereinafter illustrated in the drawings, fully described in the detailed description of the preferred embodiments and particularly pointed out in the claims. However, such drawings and description disclose just a few of the various ways in which the invention may be practiced.

DESCRIPTION OF THE PREFERRED EMBODIMENTS

This invention is based on the idea of using a forced diagnostic schema to discern genuine fault conditions from sympathy errors and to isolate culpable components within a communication fabric of a computer storage system. The invention disclosed herein may be implemented as a method, apparatus or article of manufacture using standard programming or engineering techniques to produce software, firmware, hardware, or any combination thereof. The term "article of manufacture" as used herein refers to code or logic implemented in hardware or computer readable media such as optical storage devices, and volatile or non-volatile memory devices. Such hardware may include, but is not limited to, field programmable gate arrays ("FPGAs"), application-specific integrated circuits ("ASICs"), complex programmable logic devices ("CPLDs"), programmable logic arrays ("PLAs"), microprocessors, or other similar processing devices.

Figure 1:
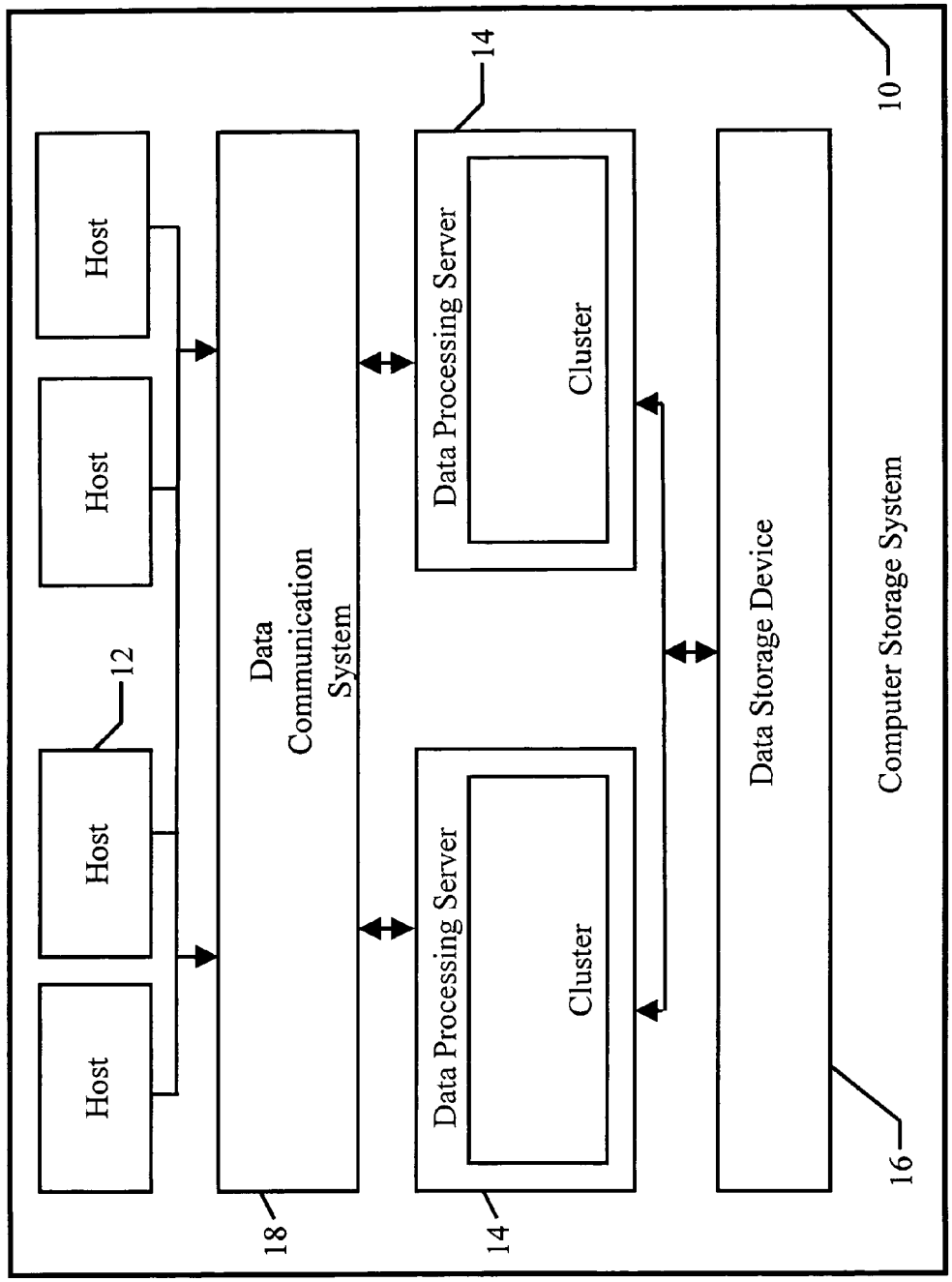
FIG. 1 is a block diagram illustrating a computer storage system including host servers, data processing servers, data storage devices, and a data communication system.
Figure 2:
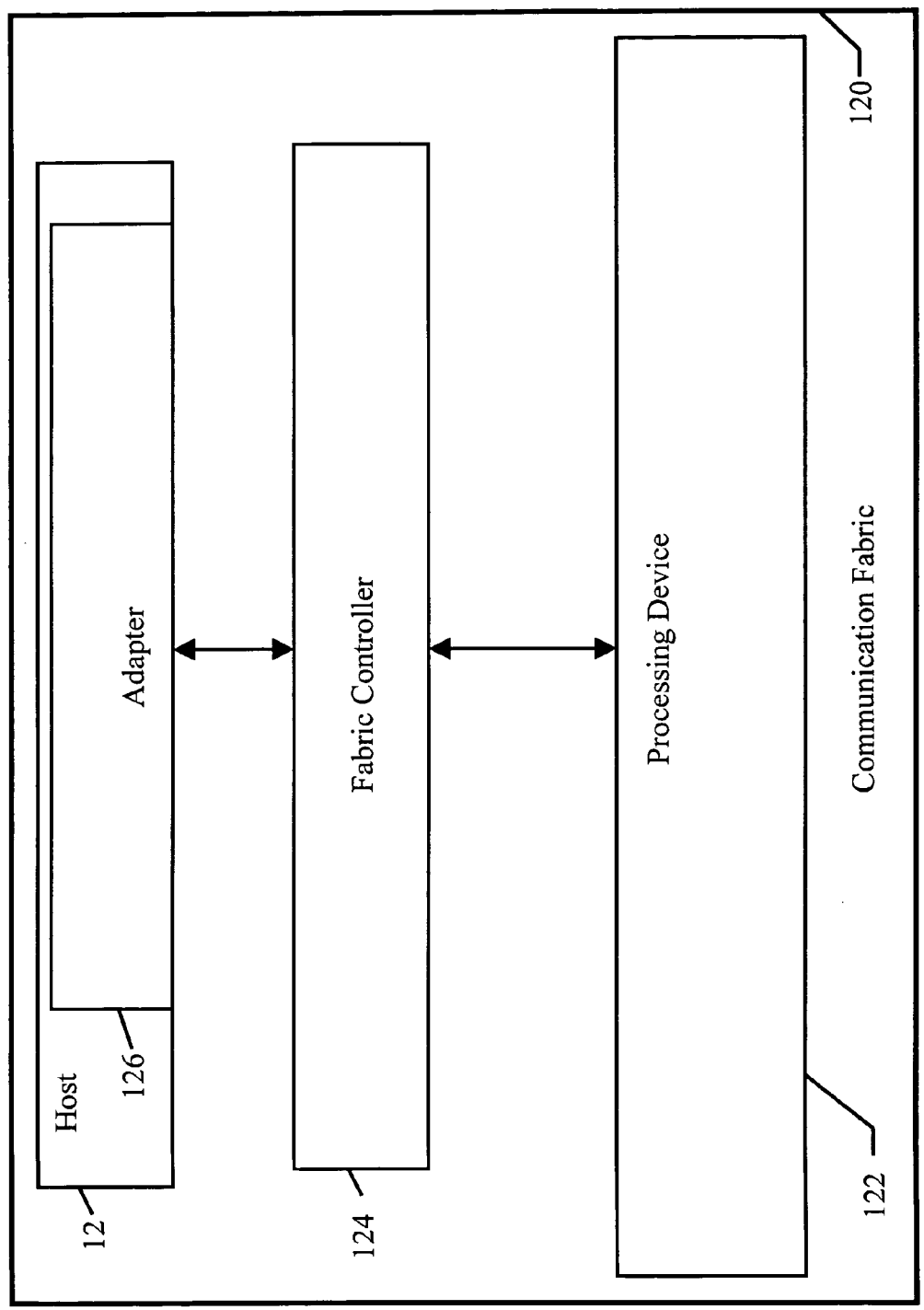
FIG. 2 is a block diagram illustrating a communication fabric including a processing device, a fabric controller, and a communication adapter.
Figure 3:
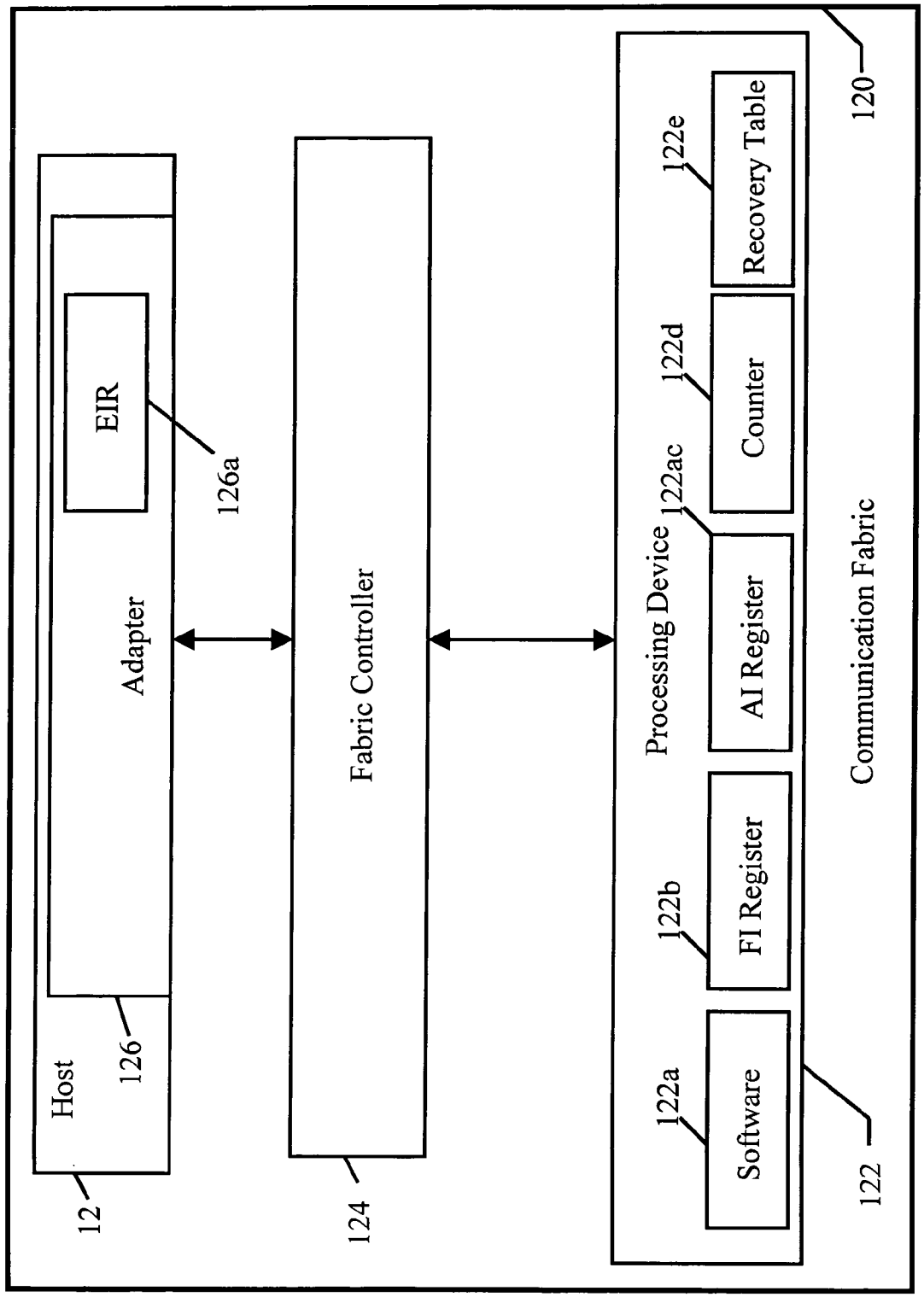
FIG. 3 is a block diagram illustrating a communication fabric, according to the invention, including an SMP complex including a software subcomponent, a fabric controller, and a host adapter.

Referring to figures, wherein like parts are designated with the same reference numerals and symbols, FIG. 3 is a block diagram illustrating a communication fabric 120 including a processing device 122, a fabric controller 124, and a host adapter 126. The SMP complex 122 includes a software subcomponent 122a. The communication fabric 120 connects the SMP complex 122 to the host adapter 126 and the host adapter connects the communication fabric 120 to a host server ("host"). The host adapter includes a memory device that may include an error information record ("EIR") 126a for reporting internal adapter errors. The processing device 122 may be a data processing server or a symmetric multiprocessor ("SMP") complex.

In this embodiment of the invention, five disparate error conditions may exist: (1) component timeout, (2) adapter warmstart timeout, (3) fabric interrupt, (4) adapter failure, and (5) adapter interrupt. A component timeout indicates that a fabric component has failed to provide an acknowledgement. An adapter interrupt indicates that the adapter has detected a failure but has not failed internally. A fabric interrupt indicates that a bus protocol violation has occurred. An adapter warmstart timeout strongly indicates that an internal error has occurred within the adapter preventing it from responding to communication requests from the processing device.

Figure 4:
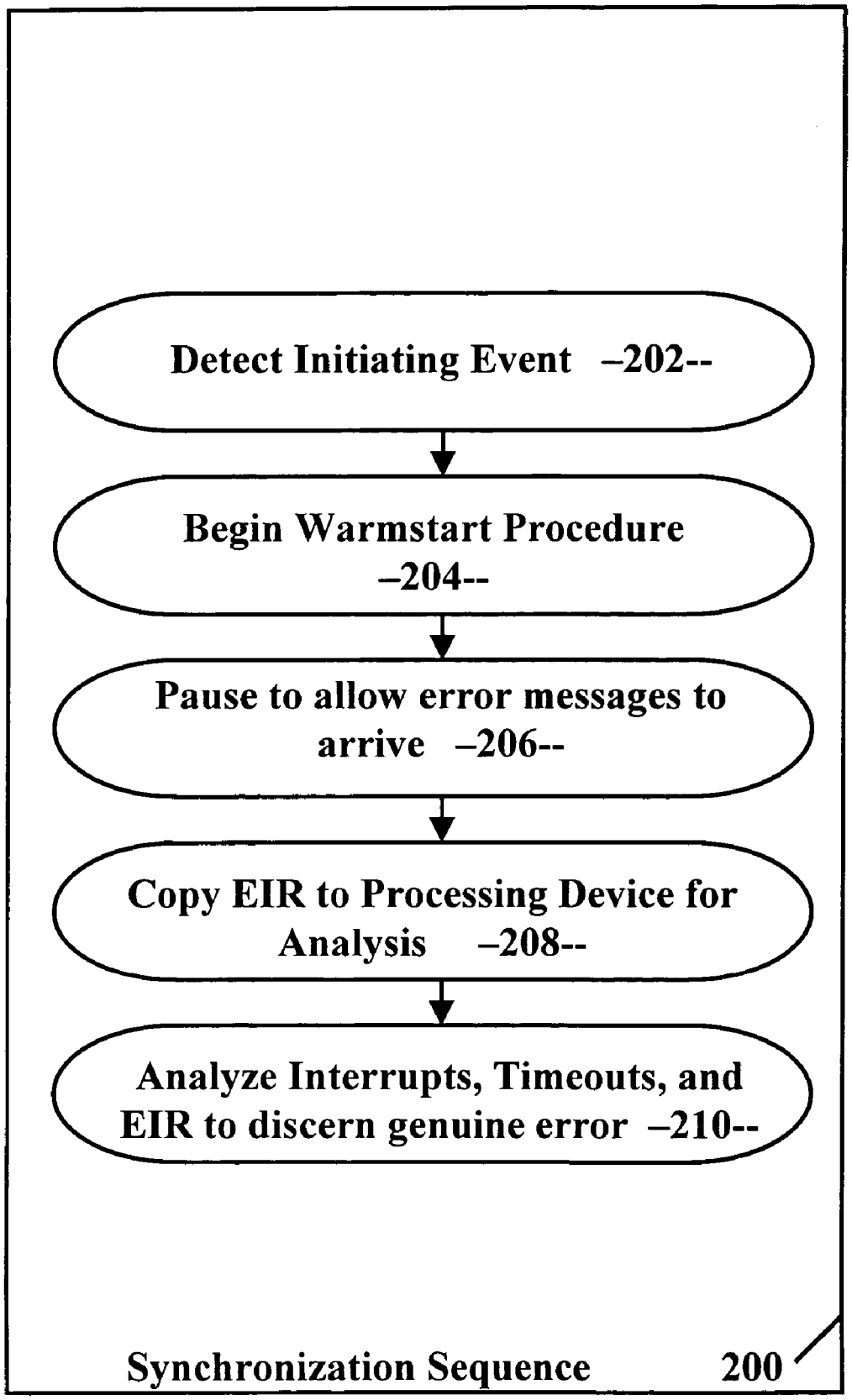
FIG. 4 is a flow chart illustrating a dynamic owner algorithm.

A synchronization sequence 200 is illustrated by the flow chart of FIG. 4. In step 202, an initiating event is detected by the software subcomponent 122a. An initiating event may be an adapter interrupt (error #5), a component timeout (error #1), or a fabric interrupt (error #3). In step 204, the software subcomponent issues a warmstart instruction, causing the fabric controllers 124 to cease communicating with each other and the host adapters 126.

In step 206, the software subcomponent 122a waits a predetermined period of time for a fabric interrupt (error #3) and adapter interrupt (error #5) to arrive at the SMP complex 122. The fabric interrupt is placed in a fabric interrupt register 122b (FIG. 3) and the adapter interrupt is placed in an adapter interrupt register 122c (FIG. 3). Subsequently, the software subcomponent determines whether an error information record ("EIR") 126a is present in the host adapter 126 (FIG. 3) and, if so, copies the EIR to the SMP complex for analysis in step 208. In step 210, the errors, timeouts, and interrupts are evaluated to determine which component is genuinely responsible for the errors. Various scenarios are explored below.

In the first scenario, the only error received is a component timeout (error #1) indicating that a host adapter 126 has failed to acknowledge a message. A threshold counter 122d is incremented in the SMP complex 122. Because an adapter warmstart timeout (error #2) was not detected, indicating the adapter was sufficiently functional to acknowledge the start of warmstart, then no reset is required at this time.

In the second scenario, the only error received is an adapter warmstart timeout (error #2) indicating that an previously functional host adapter 126 failed to respond to a warmstart instruction. Here, the threshold counter 122d is incremented and the host adapter 126 is reset.

In the third scenario, the only error received is a fabric interrupt (error #3) indicating that a fabric controller 124 has observed a fabric protocol violation by the host adapter 126. The threshold counter 122d is incremented but no recovery step is initiated.

In a fourth scenario, the only error received is an adapter failure (error #4) indicating that the host adapter 126 has logged an internal failure as an EIR 126a. Some event, such as a device failure, has prevented the host adapter 126 for transmitting an adapter interrupt (error #5) to the software subcomponent 122a. In one embodiment of the invention, the software subcomponent 122a will eventually transmit a heartbeat message to the host adapter 126. When the host adapter 126 fails to respond to the heartbeat message, a component timeout (error #1) will be generated. In this case, all other errors are considered sympathetic. The threshold counter 122d is incremented and the host adapter 126 is reset.

In a fifth scenario, the only observed error condition is an adapter interrupt (error #5). Because no EIR 126a was formed (error #4), the host adapter 126 is likely to fail a warmstart process. Accordingly, the threshold counter 122d is incremented and the host adapter is reset 126.

A component timeout (error #1) accompanied by any other error condition other than an adapter failure (error #4) indicates that either a microcode failure has occurred in the host adapter 126 or that the host adapter is dropping or corrupting messages. The threshold counter is incremented and the host adapter 126 is reset.

A fabric interrupt (error #3) accompanied by any other error condition indicates that the host adapter 126 has created a bus protocol violation but has failed to claim responsibility by generating an adapter failure (error #4) or interrupt (error #5). The threshold counter 122d is incremented and the host adapter 126 is reset.

An adapter failure (error #4) accompanied by any other error condition indicates that the adapter has claimed responsibility and all other error messages are sympathetic. The threshold counter 122d is incremented and the host adapter 126 is reset.

If multiple error conditions are present, then a traditional system would normally increment the threshold counter 122d a corresponding number of times. Because some or most of these error conditions are potentially sympathetic errors, duplicate increments of the threshold counter 122d should be avoided. Accordingly, the errors are ranked by importance and errors of lesser importance are considered sympathetic.

Once the analysis process has completed, recovery actions such as warmstarts and resets will be implemented. However, multiple errors may result in multiple recovery actions being scheduled. In order to avoid redundant recovery actions, the recovery events are accumulated into a single course of action. In this way, the best recovery actions for the system and the components are applied at one time.

Figure 5A:
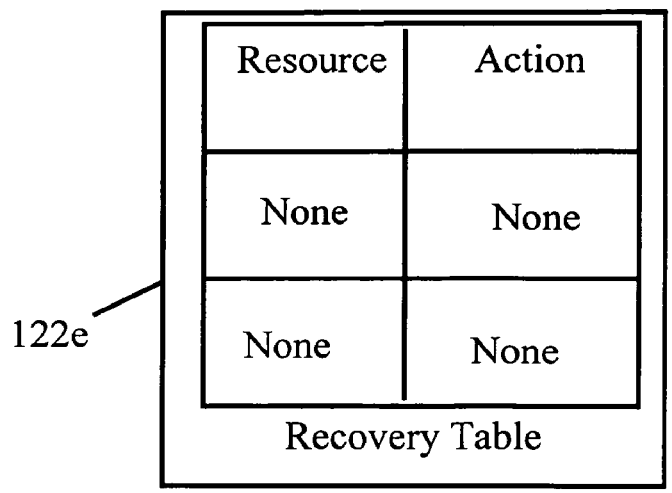
FIG. 5a is a block diagram illustrating a blank recovery table.
Figure 5B:
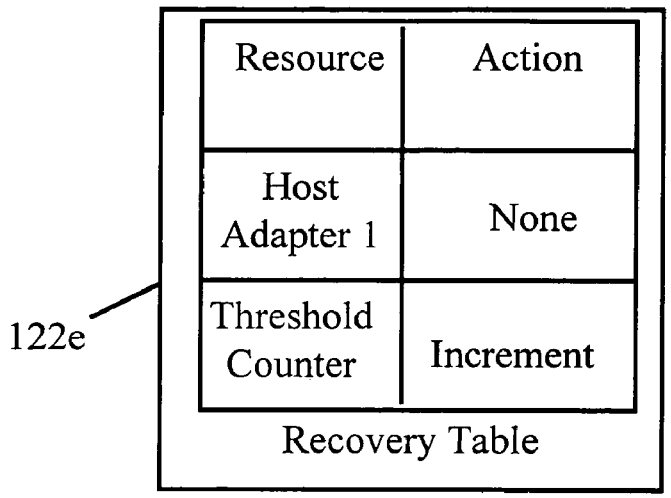
FIG. 5b is a block diagram illustrating the recovery table of FIG. 5a, after a recovery event has been logged.
Figure 5C:
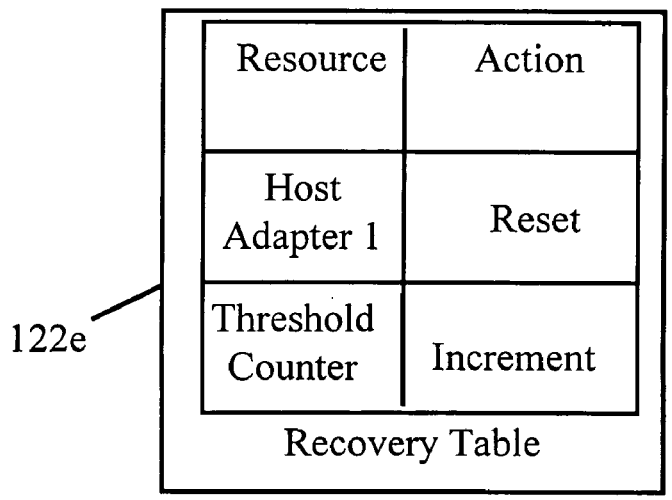
FIG. 5c is a block diagram illustrating the recovery table of FIG. 5b, after a higher priority recovery event has overwritten the previously logged event.

FIGS. 5a, 5b, and 5c illustrate the recovery table 122e, residing in the SMP complex 122, that indicates system resources. In FIG. 5a, no recovery actions have yet been logged. During analysis (step 210 of FIG. 4), recovery actions are logged to the recovery table, as illustrated in FIG. 5b. In FIG. 5c, the recovery action illustrated in FIG. 5b has been overwritten by a higher priority recovery action based upon analysis of addition error conditions. Once analysis is complete and all recovery actions have been logged to the recovery table 122e, the logged recovery actions are implemented.

Those skilled in the art of making computer support systems may develop other embodiments of the present invention. However, the terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

I claim:

1. A method of isolating failures in a communication fabric, the communication fabric including a processing device, a threshold counter, a fabric controller, a host adapter, and a host, the method comprising the steps of:
    detecting an initiating event in the processing device;
    initiating a warmstart procedure causing the fabric controller to cease communication with the host adapter;
    pausing a predetermined period to allow a plurality of error messages including a first error message indicative of a failure of a first component and a second error message indicative of a reaction of a second component to a condition caused the failure of the first component to arrive at a processing device, said processing device including a software subcomponent; and
    evaluating the plurality of error messages to discern a source of an error,
wherein the second error message is a component timeout, and wherein evaluating the plurality of error messages to discern a source of an error comprises determining that the host adapter is not a source of an error.

2. A method of isolating failures in a communication fabric, the communication fabric including a processing device, a threshold counter, a fabric controller, a host adapter, and a host, the method comprising the steps of:
    detecting an initiating event in the processing device;
    initiating a warmstart procedure causing the fabric controller to cease communication with the host adapter;
    pausing a predetermined period to allow a plurality of error messages including a first error message indicative of a failure of a first component and a second error message indicative of a reaction of a second component to a condition caused the failure of the first component to arrive at a processing device, said processing device including a software subcomponent; and
    evaluating the plurality of error messages to discern a source of an error,
wherein the second error message is an adapter warmstart timeout, and wherein evaluating the plurality of error messages to discern a source of an error comprises determining that the host adapter is a source of an error.

3. A method of isolating failures in a communication fabric, the communication fabric including a processing device, a threshold counter, a fabric controller, a host adapter, and a host, the method comprising the steps of:
    detecting an initiating event in the processing device;
    initiating a warmstart procedure causing the fabric controller to cease communication with the host adapter;
    pausing a predetermined period to allow a plurality of error messages including a first error message indicative of a failure of a first component and a second error message indicative of a reaction of a second component to a condition caused the failure of the first component to arrive at a processing device, said processing device including a software subcomponent; and
    evaluating the plurality of error messages to discern a source of an error,
wherein the second error message is a fabric interrupt, and wherein evaluating the plurality of error messages to discern a source of an error comprises determining that the host adapter has performed a fabric protocol violation.

4. A method of isolating failures in a communication fabric, the communication fabric including a processing device, a threshold counter, a fabric controller, a host adapter, and a host, the method comprising the steps of:
    detecting an initiating event in the processing device;
    initiating a warmstart procedure causing the fabric controller to cease communication with the host adapter;
    pausing a predetermined period to allow a plurality of error messages including a first error message indicative of a failure of a first component and a second error message indicative of a reaction of a second component to a condition caused the failure of the first component to arrive at a processing device, said processing device including a software subcomponent; and
    evaluating the plurality of error messages to discern a source of an error,
wherein the second error message is an adapter failure, and wherein evaluating the plurality of error messages to discern a source of an error comprises transmitting a heartbeat message to the host adapter, receiving a component timeout, and determining that the host adapter is a source of an error.

5. A method of isolating failures in a communication fabric, the communication fabric including a processing device, a threshold counter, a fabric controller, a host adapter, and a host, the method comprising the steps of:
    detecting an initiating event in the processing device;
    initiating a warmstart procedure causing the fabric controller to cease communication with the host adapter;
    pausing a predetermined period to allow a plurality of error messages including a first error message indicative of a failure of a first component and a second error message indicative of a reaction of a second component to a condition caused the failure of the first component to arrive at a processing device, said processing device including a software subcomponent; and evaluating the plurality of error messages to discern a source of an error, wherein the second error message is an adapter interrupt, and wherein evaluating the plurality of error messages to discern a source of an error comprises determining that the host adapter is a source of an error.

* * * * *

UNITED STATES PATENT AND TRADEMARK OFFICE
CERTIFICATE OF CORRECTION

PATENT NO. : 7,624,305 B2  Page 1 of 1
APPLICATION NO. : 10/991780
DATED : November 24, 2009
INVENTOR(S) : De Araujo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 884 days.

Signed and Sealed this

Twenty-sixth Day of October, 2010

David J. Kappos
*Director of the United States Patent and Trademark Office*